United States Patent
Bohn

[15] 3,693,900
[45] Sept. 26, 1972

[54] FILM CARTRIDGE LOADER
[72] Inventor: Arlin L. Bohn, Blaine, Minn.
[73] Assignee: Minnesota Mining and Manufacturing Company, Saint Paul, Minn.
[22] Filed: April 7, 1971
[21] Appl. No.: 131,876

[52] U.S. Cl.................242/56 R, 156/506, 242/58.4, 242/67.3
[51] Int. Cl. .............................B65h 19/20
[58] Field of Search............242/56 R, 58, 58.1, 58.2; 156/502, 504, 506

[56] References Cited

UNITED STATES PATENTS 3,637,153   1/1972   King.....................242/56 R

FOREIGN PATENTS OR APPLICATIONS 638,642   3/1962   Canada....................156/502

Primary Examiner—Stanley N. Gilreath
Assistant Examiner—Milton S. Gerstein
Attorney—Kinney, Alexander, Sell, Steldt & Delahunt

[57] ABSTRACT

Apparatus for automatically loading a length of film into a cartridge having a rotatable reel disposed within the cartridge shell. The film is fed from a supply, its free end is connected to the cartridge reel at a first station and the cartridge reel is driven to wind a predetermined length of film onto the reel. The film is severed between the supply and the cartridge so that a free film end extends from the cartridge. The cartridge is then moved to a second station at which the free film end is spliced to one end of a film leader. The film and a major portion of the leader are then wound into the cartridge.

5 Claims, 4 Drawing Figures

INVENTOR.
ARLIN L. BOHN
BY Kinney, Alexander,
Sell, Steldt & DeLaHunt
ATTORNEYS

INVENTOR.
ARLIN L. BOHN
BY Kinney, Alexander,
Sell, Steldt & DeLaHunt
ATTORNEYS

FILM CARTRIDGE LOADER

FIELD OF THE INVENTION

The present invention relates to an apparatus for loading a length of film into a cartridge having a rotatable reel disposed within the cartridge shell.

BACKGROUND OF THE INVENTION

Cartridges have provided a convenient way of handling and storing microfilm, each cartridge in effect comprising a library of information. Such cartridges have generally comprised a cartridge shell within which a rotatable reel is disposed, the cartridge shell being formed with a film aperture through which the film is wound onto and withdrawn from the reel. In general, the cartridges are assembled with a film trailer secured to the reel and extending out of the cartridge through the film aperture and the free end of the trailer is releasably secured to the exterior of the cartridge shell. To load a length of unexposed or exposed and processed microfilm into the cartridge, one end of the length of film is spliced to the free end of the trailer, the cartridge reel is driven to wind a majority of the film onto the reel and a film leader is then spliced onto the opposite end of the microfilm. Previously, the aligning and splicing of the film to the trailer and the leader to the film have been performed manually and in many cases even the winding of the film onto the cartridge reel has involved manual labor. These manual operations have made the loading of microfilm into cartridges a slow and tedious operation.

SUMMARY OF THE INVENTION

The apparatus of the present invention automatically loads a length of film into a cartridge having a rotatable reel disposed within the cartridge shell and a film aperture through the shell. The apparatus supports a cartridge and a film supply and connects the free end of a supported film supply to the reel within a supported cartridge at a first film connecting station. A drive then rotates the reel in the cartridge to wind a predetermined length of film onto the reel and thereafter the film is severed between the film supply and the cartridge to produce a free film end extending from the supported cartridge. After the film has been severed the cartridge support is moved to move the cartridge from the first film connecting station to a second film connecting station. At the second film connecting station the free film end extending from the supported cartridge is spliced to one end of a film leader. The cartridge reel may then again be driven to wind the film and a major portion of the film leader into the cartridge to complete the loading operation.

THE DRAWING

Figure 1:
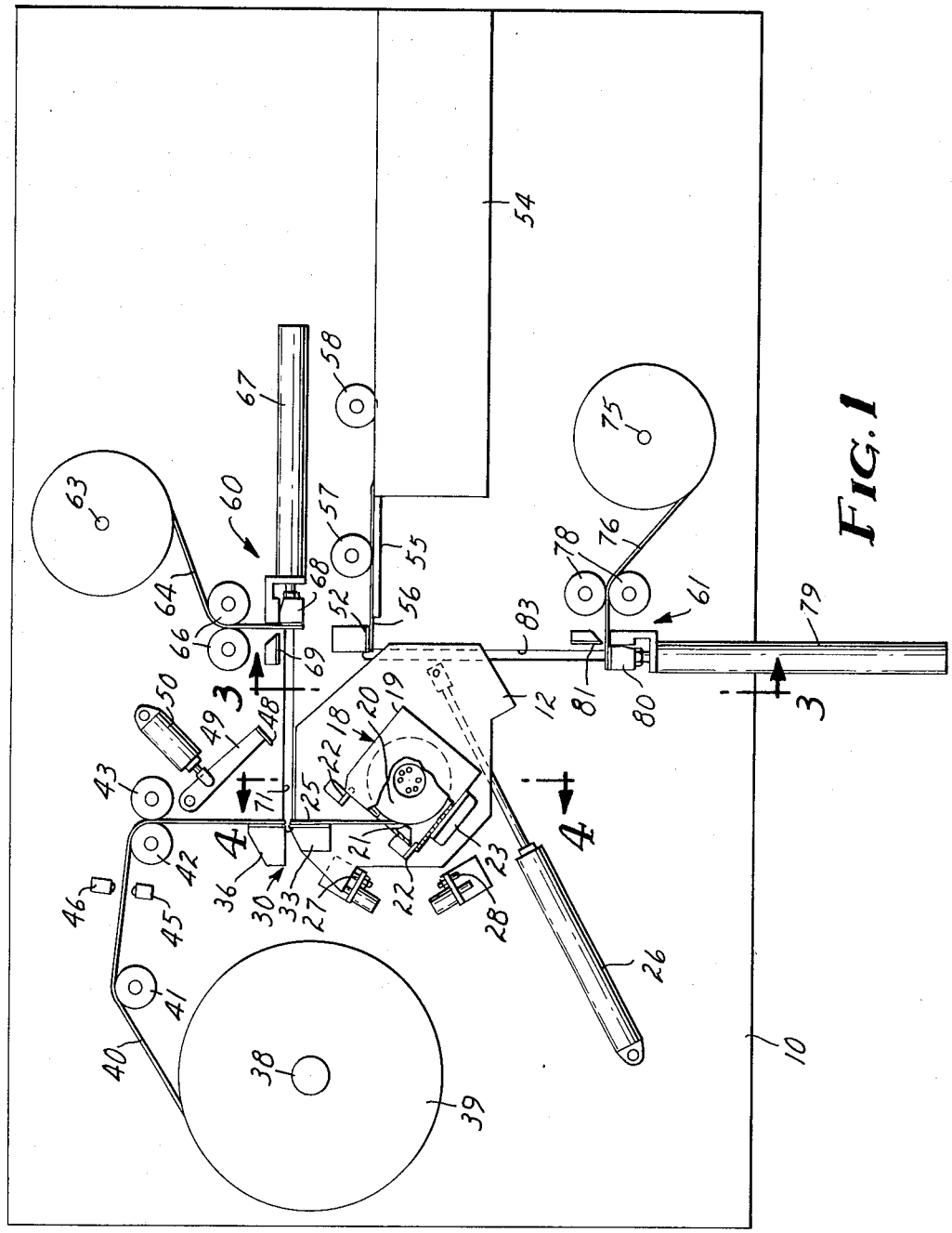
FIG. 1 is an elevation view of a film cartridge loader constructed in accordance with the present invention.

Referring now to the drawings, there is illustrated a film cartridge loader constructed in accordance with the present invention. A vertical support plate 10 provides the major support for the functional elements of the cartridge loader.

A rotatable cartridge support plate 12 is disposed parallel to the frame plate 10 and is supported by a hollow cylindrical hub 13, which hub is secured to the cartridge support plate 12 and supported for free rotation by the frame plate 10. A drive motor 15 is supported on the rear face of the frame plate 10 in alignment with the axis of the cartridge support plate hub 13. The drive shaft 16 of the drive motor 15 extends through an aperture in the frame plate 10, through the hollow cylindrical hub 13 and through an aperture in the cartridge support plate 12. Forward of the cartridge support plate 12 the drive shaft 16 is formed to extend through an aperture in the side wall of a film cartridge 18 and engage the hub of a reel 20 rotatably disposed within the cartridge shell 19.

The cartridge 18 is releasably retained on the cartridge support plate 12 by a pair of fingers 22 formed to extend into recesses in one edge wall of the cartridge 18 and an upstanding flange 23 is formed to abut a second edge wall of the cartridge. The cartridge 18 is supported with a film aperture 21 through the shell 19 thereof lying between the fingers 22. The cartridge 18 includes a film trailer 25 with one end secured to the reel 20 and the opposite end extending out of the cartridge through the film aperture 21.

The cartridge support plate 12 is rotated between two limiting positions (compare FIGS. 1 and 2) to move the cartridge 18 from a first film connecting station 30 to a second film connecting station 31. The cartridge support plate 12 is rotated by an air cylinder 26 having its push rod connected to the rear face of the support plate 12 and rotation of the plate is limited by a pair of stationary stops 27 and 28 which cooperate with projecting portions of the plate to positively position the support plate at each of its two limiting positions.

A trailer vacuum pad 33 is secured to the cartridge support plate 12 with its vacuum face perpendicular to the plane of the support plate 12 and generally in alignment with the film aperture 21 of the supported cartridge 18. A vacuum hose 34 is connected to the trailer vacuum pad 33 through the rear of the cartridge support plate 12 and the opposite end of the hose is connected to a source of vacuum (not shown). In the first position of the cartridge support plate 12 (illustrated in FIG. 1) the vacuum face of the trailer vacuum pad 33 is in a vertical position. A film vacuum pad 36 is stationarily supported by the frame plate 10 adjacent the first position of the trailer vacuum pad 33. The vacuum face of the film vacuum pad 36 is disposed in vertical alignment with the vacuum face of the trailer vacuum pad 33 and communicates with the source of vacuum through a hose 37. The combination of the film vacuum pad 36 and the trailer vacuum pad 33 in its first position defines the first film connecting station 30.

A film supply support spindle 38 extends from the frame plate 10 to support a film supply reel 39 and to provide a constant back tension in the film as it is withdrawn from the reel. A film path from the supply reel 39 to the film vacuum pad 36 is defined by a guide roller 41 and a capstan drive comprising a capstan 42 and a pressure roller 43. The nip area between the capstan 42 and the pressure roller 43 is positioned in vertical alignment with the vacuum face of the film vacuum pad 36.

A photocell 45 is supported by the frame plate 10 between the guide roller 41 and the capstan 42 on one side of the film guide path. A light source 46 is supported by the frame plate 10 on the opposite side of the film path from the photocell 45 and in alignment therewith. The photocell 45 is provided to sense an extended transparent portion of the film between lengths of the film having recorded information thereon and for providing a signal to disable the capstan drive in response thereto.

A film severing blade 48 is supported at one end of an arm 49 which is pivoted on the frame plate 10 at its opposite end for movement of the blade 48 into the area between the film vacuum pad 36 and the trailer vacuum pad 33 in its first position. An air cylinder 50 normally retains the arm 49 in a retracted position and upon activation of the cylinder provides pivoting of the arm 49 and thereby movement of the blade 48 to sever the film 40 between the film vacuum pad 36 and the trailer vacuum pad 33.

In the second position of the cartridge support plate 12 (illustrated in FIG. 2) the vacuum face of the trailer vacuum pad 33 is horizontally disposed. A leader vacuum pad 52 is supported by the frame plate 10 adjacent the second position of the trailer vacuum pad 33 and with its vacuum face in horizontal alignment with the vacuum face of the trailer vacuum pad. The vacuum face of the leader vacuum pad 52 communicates with the source of vacuum through a hose 53. The combination of the leader vacuum pad 56 and the trailer vacuum pad 33 in its second position defines the second film connecting station 31.

A leader supply support 54 is supported by the frame plate 10 in alignment with the leader vacuum pad 52 and a leader guide plate 55 extends therefrom toward the leader vacuum pad 52 generally in horizontal alignment with the vacuum face of the leader vacuum pad 52. A pair of leader drive rollers 57 and 58 are supported above the leader guide plate 55 and the leader supply support 54, respectively, to provide single feeding of definite length film leaders 56 from the supply support 54 to the edge of the leader vacuum pad 52 adjacent to the cartridge support plate 12. The drive to the leader drive rollers 57 and 58 is activated each time the trailing edge of a leader 56 is withdrawn from the supply support across the guide plate 55.

A pair of similar film splicers 60 and 61, respectively, provide splicing of the film 40 to the film trailer 25 at the first film connecting station 30 and splicing of the film to a film leader 56 at the second film connecting station 31. The splicers 60 and 61 are similar and only the film to trailer splicer 60 will be described in detail.

The splicer 60 comprises a spindle 63 extending from the frame plate 10 to support a roll of adhesive tape 64, a capstan drive 66 for advancing the adhesive tape, an air cylinder 67 with a vacuum pad 68 secured to its push rod and a stationary tape severing blade 69. The air cylinder 67 is supported by the frame plate 10 in alignment with the vacuum faces of the trailer and film vacuum pads 33 and 36 when the cartridge support plate 12 is in its first position. The splicer vacuum pad 68 is normally supported by the air cylinder 67 with its vacuum face in alignment with the nip of the capstan drive 66 to receive a length of adhesive tape 64 advanced adhesive side out onto its vacuum face by the capstan drive. The tape severing blade 69 is positioned to sever the adhesive tape 64 against the upper surface of the splicer vacuum pad 68 as it is advanced by the air cylinder 67. A horizontal guide slot 71 is formed through the frame plate 10 and a guide rod 72 extends from the vacuum pad 68 into the guide slot 71. The vacuum face of the splicer vacuum pad 68 communicates with the source of vacuum through the guide rod 72 and a hose 70. The guide rod 72 and guide slot 71 guide the splicer vacuum pad 68 as it is moved by the air cylinder 67 so that its vacuum face carrying a length of adhesive tape will bridge the gap between the trailer and film vacuum pads 33 and 36. At the end of its travel, the splicer vacuum pad 68 presses the length of tape 64 carried thereon against the trailer 25 and the film 40 to splice them together. Each time the splicer vacuum pad 68 returns to its normal rest position illustrated in FIG. 1, the tape capstan drive 66 advances the adhesive tape 64 a distance corresponding to the height of the vacuum face of the splicer vacuum pad.

The splicer 61 similarly comprises a spindle 75 for supporting a roll of adhesive tape 76, a capstan drive 78, an air cylinder 79 supporting a splicer vacuum pad 80, and a tape severing blade 81. A guide slot 83 is formed through the frame plate 10 and a guide rod 84 extends from the vacuum pad 80 into the guide slot to guide the facuum face of the vacuum pad 80 so that it will bridge the gap between the leader vacuum pad 52 and the trailer vacuum pad 33 in its second position. The vacuum face of the splicer vacuum pad 80 communicates with the source of vacuum through the guide rod 84 and a hose 82.

In use, a cartridge 18 is placed on the cartridge support plate 12 in the position illustrated in FIG. 1. The free end of the film trailer 25 is positioned on the vacuum face of the trailer vacuum pad 33 with its leading edge positioned at the edge of the trailer vacuum pad adjacent the film vacuum pad 36. A supply reel 39 of film 40 is placed on the film supply spindle 38 and the free end of the film is threaded over the guide roller 41 between the capstan 42 and the pressure roller 43 and onto the vacuum face of the film vacuum pad 36. The leading edge of the film 40 is positioned at the edge of the film vacuum pad 36 in juxtaposition and alignment with the leading edge of the trailer 25. A free end of the uppermost leader 56 in the leader supply is advanced into position on the vacuum face of the leader vacuum pad 52. The apparatus is then in the position illustrated in FIG. 1 and ready to automatically load a predetermined length of film into the cartridge 18.

Automatic operation of the apparatus is initiated by the operator manually depressing a switch (not shown) to activate appropriate electrical circuitry which provides the sequencing of operations hereinafter described. The trailer to film splicer 60 is first activated and its air cylinder 67 moves the splicer vacuum pad 68 along the guide slot 71 to sever a length of tape and press it against the adjacent ends of the trailer and the film to splice the juxtaposed and aligned ends of the trailer 25 and the film 40 together. The air cylinder then returns the vacuum pad to its rest position and the tape capstan drive 66 advances a length of tape onto the splicer vacuum pad 68.

After the splice has been made, the vacuum to the trailer vacuum pad 33 and the film vacuum pad 36 is removed and air may be forced through the vacuum faces thereof to prevent abrasion of the film 40 by the vacuum pads as it is wound into the cartridge. The drive to the film capstan 42 and the reel drive motor 15 are then activated to withdraw film from the supply reel 39 and to wind it onto the reel 29 within the cartridge 18. After a predetermined length of film has been wound into the cartridge, an extended transparent portion of the film will pass between the photocell 45 and the light source 46 and the photocell will provide a signal to disable the drive to the film capstan 42. The momentum of the moving film 40 will carry the transparent portion thereof past the capstan and into a position bridging the trailer vacuum pad 33 and the film vacuum pad 36. After the film has stopped moving the cartridge reel drive motor 15 is deactivated and the vacuum is reapplied to the trailer and film vacuum pads 33 and 36 to draw the film against the vacuum faces thereof. The air cylinder 50 is activated to move the film severing blade 48 into the space between the trailer vacuum pad 33 and the film vacuum pad 36 to sever the film. Upon severing of the film the air cylinder 50 immediately retracts the blade 48 to its rest position. At this stage the predetermined length of film has been wound into the cartridge 18, a free end thereof extends from the cartridge and is positioned on the trailer vacuum pad 33, and a new free end of the film supply is positioned on the film vacuum pad 36 in readiness for loading film into a subsequent cartridge.

Figure 2:
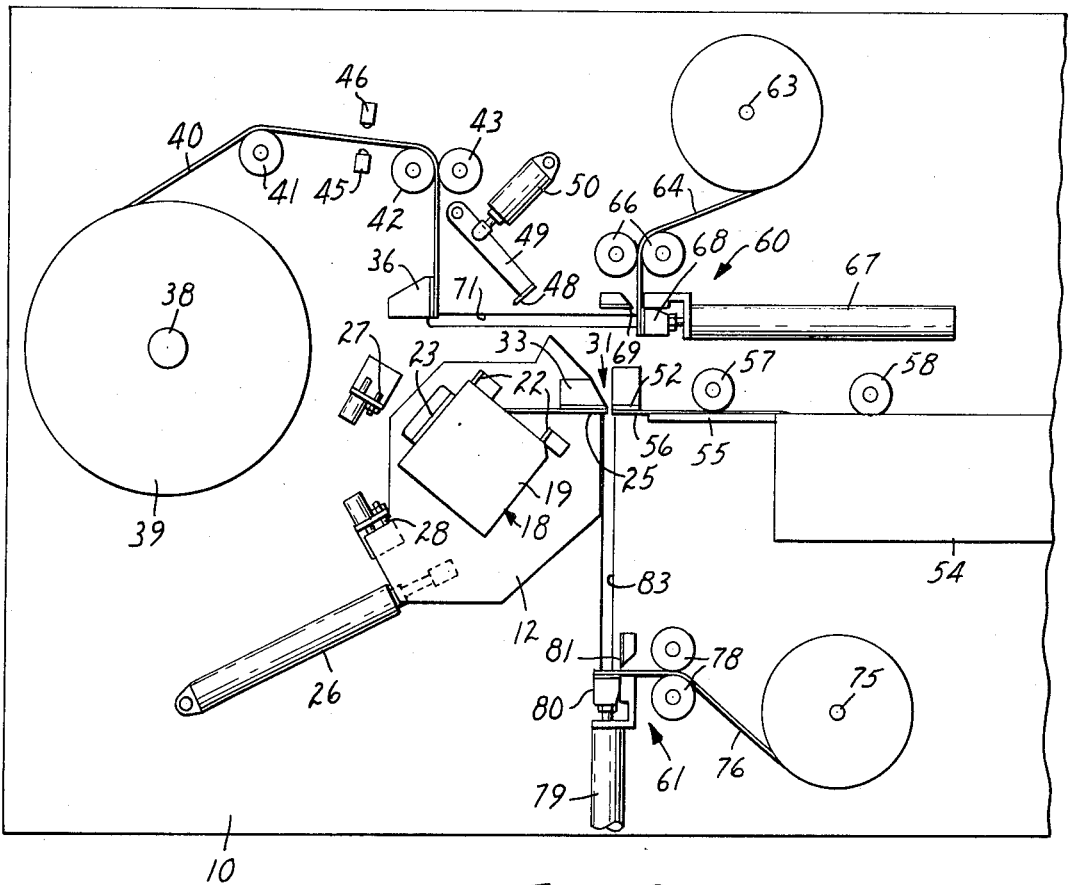
FIG. 2 is a view similar to that of FIG. 1 partially in section and illustrating a different position of the parts.
Figure 3:
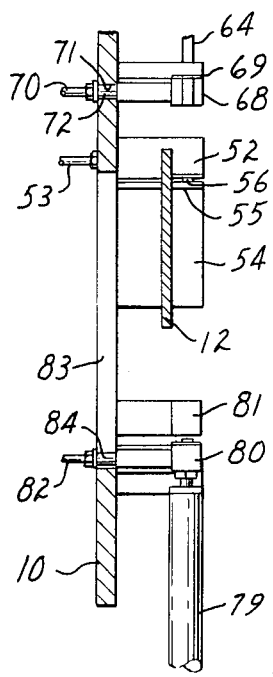
FIG. 3 is a transverse cross sectional view taken along line 3—3 of FIG. 1.
Figure 4:
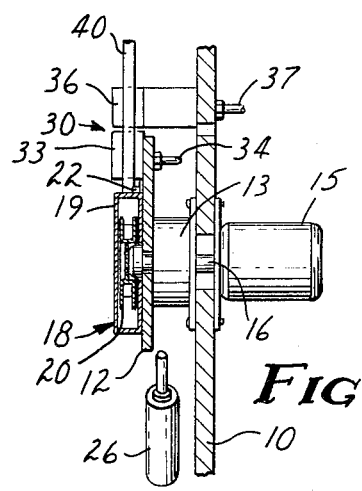
FIG. 4 is a transverse view taken along line 4—4 of FIG. 1.

With the free film end positioned on the trailer vacuum pad 33 the air cylinder 26 is activated to rotate the cartridge support plate 12 against the second limiting stop 28 to move the cartridge from the first film connecting station 30 to the second film connecting station 31 (see FIG. 2). Rotation of the cartridge support plate 12 to its second position positions the trailer vacuum pad 33 and the free film end positioned thereon in juxtaposition and alignment with the leader vacuum pad 52 and the end of a leader 56 positioned thereon.

The film to leader splicer 61 is then activated to sever and carry a length of adhesive tape on the splicer vacuum pad 80 and to press it against the juxtaposed and aligned free film end and leader end to splice them together. Upon return of the tape vacuum pad 80 to its rest position the tape capstan drive 78 advances a length of tape onto the vacuum face thereof. After the splice has been formed the reel drive motor 15 is again activated to wind the remainder of the film 40 and a major portion of the film leader 56 into the cartridge 18. Withdrawal of the leader 56 from the leader supply support 54 activates the leader drive rollers 57 and 58 to advance one end of the next leader out of the supply support 54 across the guide 55 and into position on the vacuum face of the leader vacuum pad 52.

Finally, the air cylinder 26 is activated to return the cartridge support plate 12 to its first position against the first limiting stop 27 and the loaded cartridge may be removed. The apparatus is then ready to automatically load film into further cartridges.

I claim:

1. Apparatus for loading a length of film into a cartridge having a rotatable reel disposed within the cartridge shell and a film aperture through the shell comprising:
   a cartridge support,
   a film supply support,
   a first film connecting station,
   means for connecting the free end of a supported film supply to the reel within a supported cartridge at said first film connecting station,
   means for driving the reel to which the free end of the film supply is connected to wind a predetermined length of film onto the reel,
   means for severing the film between said film supply support and said cartridge support after a predetermined length of film has been wound onto the reel to provide a free film end extending from the supported cartridge,
   a second film connecting station spaced from said first station,
   means for moving said cartridge support to move the supported cartridge from said first film connecting station to said second film connecting station,
   a film leader supply support, and
   means for splicing one end of a supported film leader to a free film end extending from the supported cartridge at said second film connecting station.

2. Apparatus as recited in claim 1 wherein said cartridge supports includes free film end positioning means for positioning the free film end extending from the supported cartridge, and wherein said second film connecting station comprises leader positioning means for positioning one end of the supported film leader and including means for aligning said film positioning means with said leader positioning means when the supported cartridge is moved to said second film connecting station to position the free film end and the leader end in juxtaposition and alignment.

3. Apparatus as recited in claim 2 wherein said means for splicing the film connecting end of a supported leader to a free film end extending from the supported cartridge comprises:
   a pressure sensitive adhesive tape supply,
   a vacuum pad,
   means for feeding tape from said supply adhesive side out onto the vacuum face of said vacuum pad,
   means for severing the tape between said tape supply and said vacuum pad, and
   means for moving said vacuum pad to press the adhesive side of a severed length of tape supported thereon against the leader and the film to bridge the aligned ends thereof to splice the leader and the film together.

4. Apparatus as recited in claim 2 for loading a cartridge having a trailer with one end secured to the reel and a free end extending out of the cartridge shell through the film aperture, wherein said means for connecting the free end of the film supply to the reel comprises means for splicing the free end of the film supply to the free end of the trailer, wherein said means for positioning the free film end provides positioning of the free end of the trailer when the cartridge is supported at said first film connecting station, wherein said first film connecting station comprises a supply film positioning means for positioning the free end of a supported film supply, and including means for aligning said free film end and trailer positioning means with said supply film positioning means at said first film connecting station to position the film supply end and the trailer end in juxtaposition and alignment.

5. Apparatus as recited in claim 4 wherein said means for splicing the free end of the film supply to the free end of the trailer and said means for splicing one end of a supported leader to a free film end extending from a supported cartridge each comprise:

a pressure sensitive adhesive tape supply,
a vacuum pad,
means for feeding tape from said supply adhesive side out onto the vacuum face of said vacuum pad,
means for severing the tape between said tape supply and said vacuum pad, and
means for moving said vacuum pad to press the adhesive side of a severed length of tape supported thereon against the film and a juxtaposed and aligned trailer or leader end to bridge the aligned ends to splice them together.

* * * * *